May 12, 1964  D. V. OLTMAN ETAL  3,132,427
MEASURING APPARATUS
Filed June 8, 1961  3 Sheets-Sheet 1
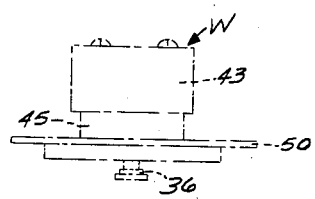
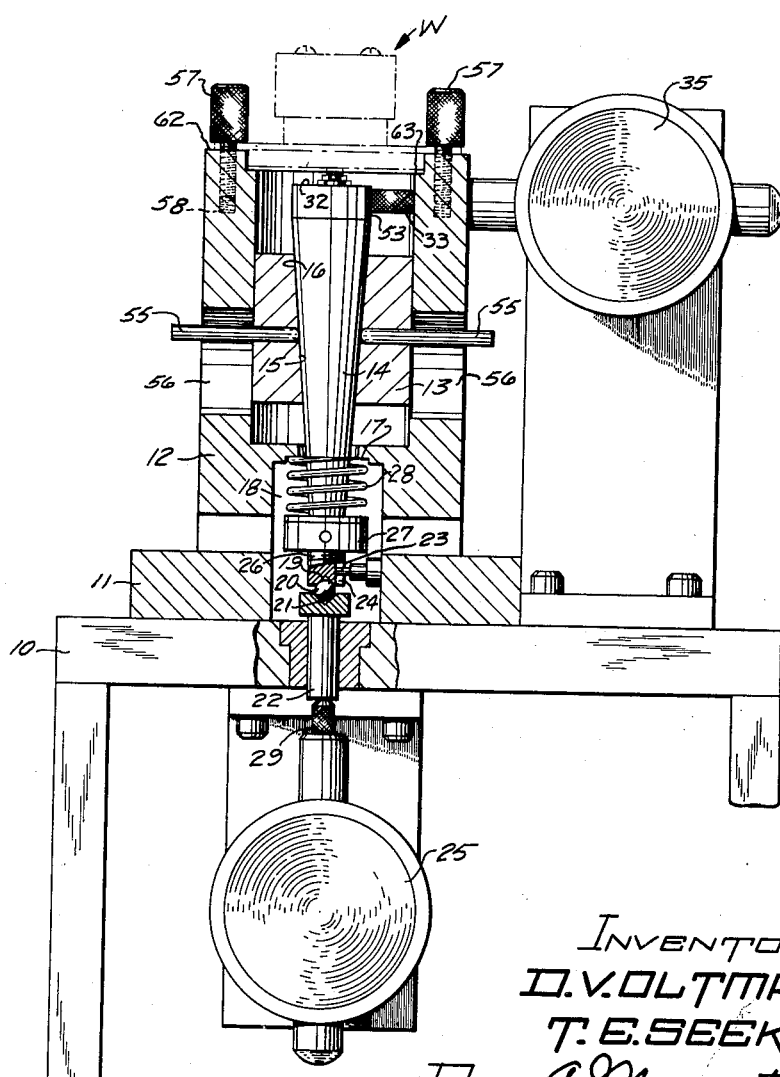
INVENTORS
D. V. OLTMAN
T. E. SEEK
By A. J. Nugent
ATTORNEY

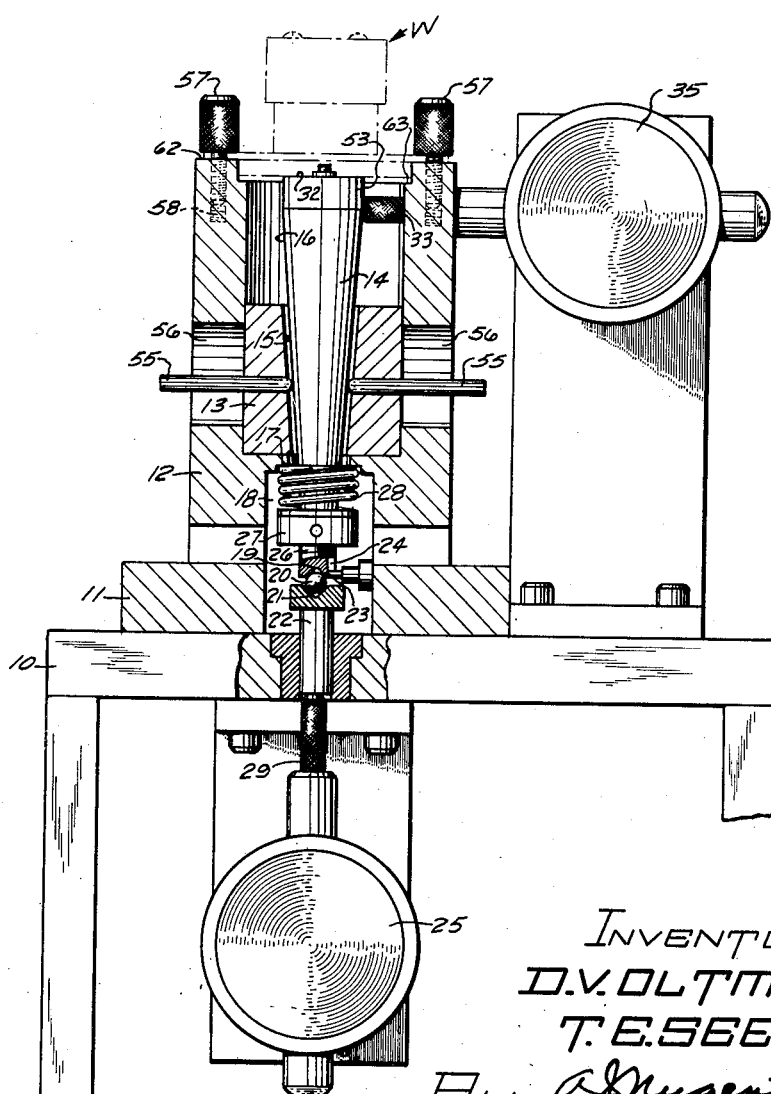

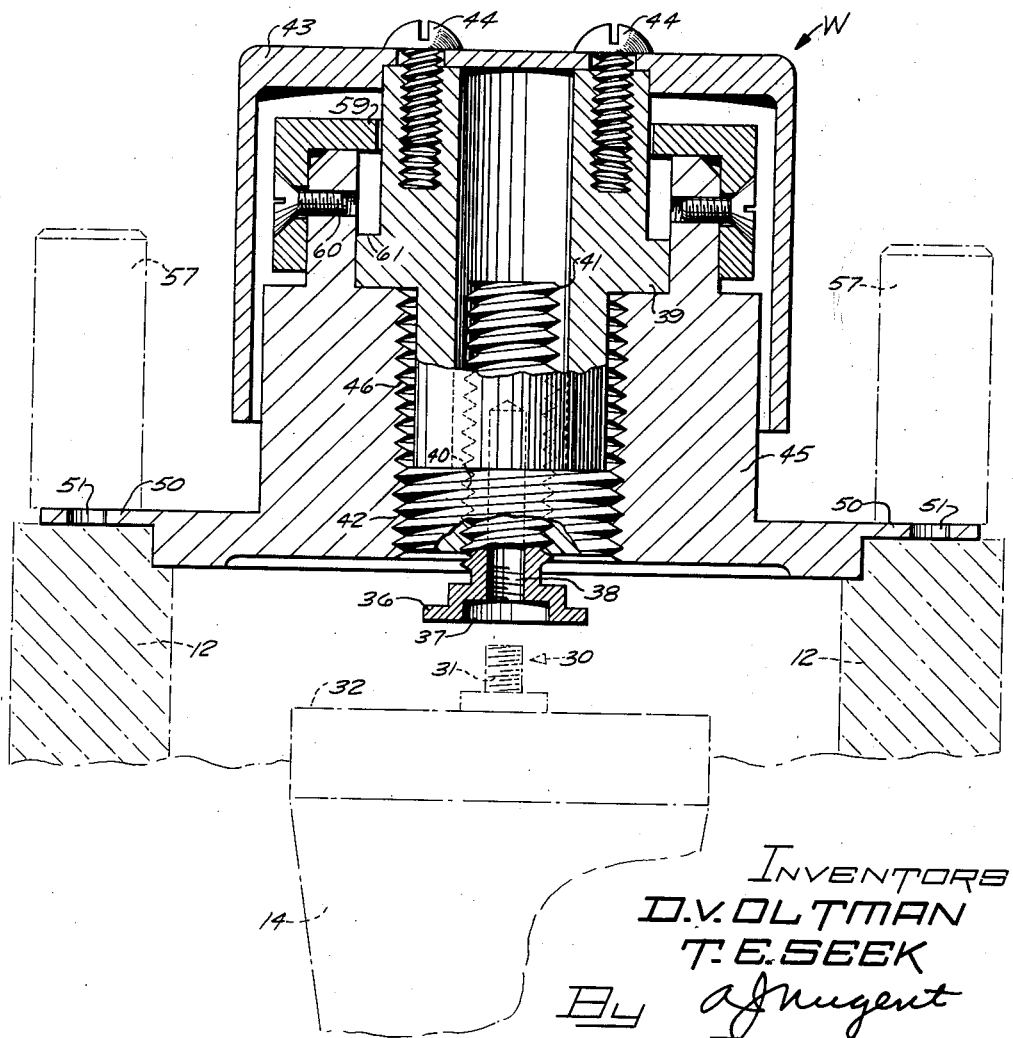

United States Patent Office 3,132,427
Patented May 12, 1964

3,132,427
MEASURING APPARATUS
David V. Oltman, Perkasie, and Tod E. Seek, Allentown, Pa., assignors to Western Electric Company, Incorporated, a corporation of New York
Filed June 8, 1961, Ser. No. 115,742
13 Claims. (Cl. 33—199)

This invention relates to measuring apparatus and particularly to a gage for measuring the thread construction in a threaded workpiece, such as a tuner assembly used in an electron discharge device.

In many applications, it is necessary that threaded assemblies be of extremely accurate constructions to meet stringent operation requirements. For example, the frequency control of electron discharge devices, such as reflex oscillators and klystrons, is based upon the variation adjustments made to its diaphragm and flexible walls surrounding the resonant cavity, and to a large degree is dependent upon the accuracy of the tuner assemblies employed therein for making such adjustments. The tuner assembly includes a plurality of different sized threaded elements threadedly connected to each other and having a common central axis, one type of which is illustrated in U.S. Patent 2,847,609 to J. O. Hamilton et al., issued August 12, 1958. It is imperative that the concentricity of the threaded elements in the workpiece, and the axial travel of its differential threaded element connected to the diaphragm be of a high degree of accuracy to assure precise frequency control.

Accordingly, the object of this invention is a measuring apparatus capable of accurately measuring the movement of a threaded workpiece.

A feature of this invention is a locating mechanism for establishing a theoretical center line for a workpiece in a measuring apparatus.

According to the general features of the invention, the workpiece is secured onto a work holding shaft. A slidable means engaging the shaft is moved in one direction to position and lock the shaft on a center line. When the sliding means is moved in the opposite direction, the shaft is released to a float position and moves normal to the center line in response to the rotation of the workpiece. Gages communicate with the shaft to detect the normal movement of the shaft from the center line, the gages indicating the concentricity and axial travel of the threaded element in the workpiece.

In a preferred embodiment, the apparatus includes a fixed outer cylindrical member through which a shaft extends having pivotal means at the lower end and means at the upper end for receiving the workpiece. An inner cylindrical member is movable between the outer member and shaft for locating and floating the shaft on a theoretical center line extending through the workpiece and members. Resilient means are connected near the lower end of the shaft for exerting axial pressure on the shaft, said axial pressure being imparted to a first gage for measuring the axial travel of a differential threaded element in the workpiece. A second gage is provided in contact with the periphery of the shaft for measuring its pivotal lateral displacement in response to any eccentricities of the threaded elements in the workpiece.

Other objects will be apparent and a fuller understanding of the invention may be had by referring to the following description and claims, taken in conjunction with the accompanying drawings, in which:

FIG. 1 is a partial-sectional view of the measuring apparatus and depicts the positioning mechanism locating and locking the shaft on a theoretical center line extending through the apparatus, and the initial position of the work piece, in phantom, prior to measurement;

FIG. 2 is a partial-sectional view of the measuring apparatus and depicts the shaft in the float or free position, and the final position of the workpiece, in phantom, after measurement; and FIG. 3 is a sectional view of the workpiece, and a fragmentary view, in phantom, of the upper portion of the measuring apparatus.

Referring now to the drawing, the apparatus is shown supported on a frame 10 on which is mounted base 11 having a fixed outer cylinder 12 projecting upwardly therefrom. An inner cylinder 13, concentrically disposed within the outer cylinder 12, is vertically slidable on a tapered shaft 14, the inner cylinder's inner surface 15 being complemental to and tapered in a manner similar to the tapered surface 16 of the shaft.

Shaft 14 extends through an inwardly projected lip 17 of cylinder 12 and into a cavity 18 located at the lower portion of outer cylinder 12 and base 11. The bottom end of shaft 14 has a convexed recess 19 in engagement with a ball 20 which is mounted in an opposing concaved recess 21 of a connecting member 22. This serves as a ball and socket joint connection to provide for limited universal movement of the shaft. The connecting member communicates with a spring-loaded plunger 29 on an indicating gage 25 which measures the axial travel of a differential threaded element 36 in workpiece W, the element and axial travel to be described in more detail hereinafter.

The lower portion of shaft 14 is threaded at 26 for receiving a threaded washer 27. A spring 28 is positioned about shaft 14, intermediate the washer 27 and lip 17, for enabling the shaft to exert an axial pressure on travel gage 25. Obviously, washer 27 may be set in any position on the shaft threaded portion to regulate the desired pressure on the travel gage 25.

As seen in FIG. 3, a stud 30, having external threads 31 for receiving a differential threaded element 36 of workpiece W, is mounted at the center of the top surface 32 of shaft 14. A pin 23 (FIG. 1), connected to base 11, extends within a slot 24 on the lower portion of shaft 14 to prevent the shaft from rotating on the threading of element 36 onto stud 30. A concentricity gage 35 includes a spring-loaded plunger 33 extending perpendicularly through the outer cylinder 12 and engaging the upper periphery of shaft 14 for measuring the concentricity of the threaded elements 36, 39 and 45 of workpiece W, said elements and concentricity measurement being described in more detail hereinafter.

The workpiece W to be measured is comprised of a first threaded element 36 having an opening 37 with an internally threaded surface 38 which is threadedly connected to the external threads 31 of stud 30. A second threaded element 39, more commonly referred to as a drive nut, is provided with internal threads 40 for threaded engagement with external threads 41 of the first threaded element 36. The external threads 41 of the first threaded element 36 are of a different pitch and diameter than the external threads 42 of drive nut 39, and consequently the first threaded element is referred to as the differential threaded element. The third threaded element 45, more commonly referred to as a drive body, is provided with internal threads 46 for threadedly connecting the drive body to the external threads 42 of drive nut 39. A circumferential flange 50 is provided on the drive body, near its bottom end, with a plurality of openings extending therethrough.

A cover 43 is connected by screws 44 to drive nut 39 to facilitate a manual rotation thereof. A flanged stop 59 is connected by screws 60 to drive body 45 and extends within the path of drive nut 39 for engaging a flange 61 thereon to limit its upward movement.

In positioning the workpiece W on the apparatus, as seen in FIG. 3, the differential threaded element 36 is securely screwed and locked onto the shaft stud 30. The drive nut 39 is screwed to drive body 45, and then the drive nut is screwed to the differential threaded element 36 until drive body flange 50 engages the top surface 62 of outer cylinder 12, and the lower end of the drive body is seated in an indented portion 63 of outer cylinder 12. In this position, the drive body urges the shaft axially downward causing a pressure to be exerted on travel gage 25. The inner cylinder 13 is then moved upwardly about the tapered shaft 14 by means of a pair of pins 55 extending therefrom through an opening 56 in the outer cylinder 12. As the tapered surface 15 of the inner cylinder slides along the opposing tapered surface 16 of the shaft, the shaft tends to be located on a center line extending through the inner cylinder. When the inner cylinder attains its maximum upward movement, that is, its top portion is wedged between the shaft and outer cylinder, the shaft is located and locked on a center line extending through the cylinders 12 and 13, and the workpiece W. After the shaft is located in the locked center line position, the drive body flange 50 is locked to the outer cylinder by passing studs 57 through the flange openings 51 and into the corresponding openings 58 of the outer cylinder.

The travel gage 25 is set in the zero position corresponding to the axial pressure exerted thereon by the shaft, and the concentricity gage 35 is set in a zero position corresponding to the established center line position of the shaft. The inner cylinder is then moved downwardly along shaft 14 thereby releasing the shaft to a free or floating position, as seen in FIG. 2.

In the measuring operation, as the drive nut is rotated, any eccentricity of the threaded elements will be indicated on the concentricity gage 35 due to the eccentric threads causing a pivotal lateral displacement of shaft 14. Simultaneously, as drive nut 39 is rotated, it is retracted within the drive body and causes the differential threaded element 36 to retract axially therewith due to element 36 having a different diameter and pitch than the drive nut and being securely locked to shaft stud 30. The axial retraction of the differential element, in turn, axially lifts the shaft upwardly therewith. In so doing, the axial pressure exerted by the shaft on the travel gage is decreased, said pressure decrease being indicated on the travel gage 25 to correspond to the axial travel of the differential threaded element.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A gage for measuring the concentricity of a plurality of threaded elements in a workpiece, which comprises, a base, a fixed outer member on the base, a shaft pivotally mounted at one end and extending within the outer member, means at the other end of the shaft for receiving the workpiece, an inner member movable between the outer member and shaft for locating the shaft on a theoretical center line extending through the members, the inner member's surfaces being slidable along respective adjacent surfaces of the outer member and shaft, and indicating means contacting the periphery of the shaft for measuring the concentricity of the threaded elements, said indicating means being responsive to the pivotal lateral displacement of the shaft upon a rotation of the workpiece.

2. A gage for measuring the axial travel of a differential threaded element within a rotatable workpiece, which comprises, a base, a fixed outer member on the base, a shaft extending within the outer member, an inner member movable between the outer member and shaft for locating the shaft on a theoretical center line extending through the members, the surfaces of the inner member being slidable along the respective adjacent surfaces of the outer member and shaft, means at one end of the shaft for receiving the workpiece, indicating means communicating with the other end of the shaft for measuring the axial travel of the differential threaded element, and resilient means connected near said other end of the shaft for exerting a pressure on the indicating means, said indicating means being responsive to a variation in pressure thereon upon the axial travel of the shaft and threaded element therewith during the rotation of the workpiece.

3. A gage according to claim 2 in which the outer member is cylindrically shaped with an inwardly protruding lip near its lower end, and the resilient means includes a threaded portion on said other end of the shaft, a corresponding threaded washer for the threaded portion, and a spring intermediate the washer and lip for enabling the shaft to exert a desired pressure on the indicating means.

4. In a gage, a mechanism for locating a workpiece on a theoretical center line, which comprises, a base, a fixed outer member on the base, a shaft located within the outer member and having means at one end for receiving the workpiece, an inner member movable between the outer member and shaft, the inner member's surfaces being slidable along the respective adjacent surfaces of the outer member and shaft, and means responsive to the movement of the inner member for locating the shaft and workpiece on a theoretical center line extnding through the inner and outer members.

5. A mechanism according to claim 4 in which the inner member has at least one surface in a corresponding inclined relationship with one of the adjacent surfaces.

6. A mechanism according to claim 4 in which the inner and outer members are of cylindrical configuration with a common central axis.

7. A gage for measuring simultaneously the concentricity of a plurality of threaded elements in a rotatable workpiece, and the axial travel of a differential threaded element therein, which comprises, a base, a fixed outer member on the base, a shaft extending within the outer member and having pivotal means at one end and workpiece receiving means at the other end, an inner member movable between the outer membr and shaft for locating and floating the shaft on a thoretical center line extending through the workpiece and members, the inner member's surfaces being slidable along respective adjacent surfaces of the outer member and shaft, resilient means connected near said one end of the shaft for exerting axial pressure thereon, and first and second indicating means communicating with the shaft for simultaneously measuring its movement responsive to the rotation of the workpiece, said first indicating means contacting the periphery of the shaft for measuring its pivotal lateral displacement responsive to the concentricity of the threaded elements, and said second indicating means engaging the pivotal end of the shaft for measuring the axial pressure exerted on the shaft responsive to the axial travel of the differential threaded element.

8. A gage, according to claim 7, in which the shaft pivotal means comprises a ball and socket joint connection between the shaft and second indicating means for providing universal movement of the shaft.

9. A gage, according to claim 7, in which the inner member has at least one surface in a corresponding tapered relationship with one of the adjacent surfaces.

10. A gage, according to claim 7, in which the inner and outer members are of cylindrical configuration with a common central axis.

11. A gage, according to claim 7, in which the workpiece is a tuner assembly including a first, second, and third element, each element having a common central axis and being threadedly connected to each other such that the second element is rotatable and intermediately disposed between the first and third elements, the external threads of the second element being of a different size than the external threads of the first element, and the workpiece receiving means comprises, a threaded stud on the shaft for securely receiving the first element, an indented portion near the top end of the outer member for receiving a flanged section of the third element, means for securing the flanged section to the outer element, and means responsive to the rotation of the second element for operating the first and second indicating means.

12. A gage for measuring simultaneously the concentricity of a plurality of threaded elements in a rotatable tuner assembly, and the axial travel of one of the threaded elements therein, which comprises, a base, a fixed outer cylinder on the base, a shaft having an externally tapered surface extending within the outer cylinder, the shaft having a threaded stud on one end for securely receiving one of the threaded elemnts and having a recessed portion on the other end, an inner cylinder movable between the outer cylinder and shaft, said inner cylinder having a tapered inner surface extending in an opposite direction than the externally tapered surface of the shaft, means for moving the inner cylinder for locating and floating the shaft on a theoretical center line extending through the tuner assembly and cylinders, a connecting member having an opposing recessed end portion corresponding to the shaft recessed portion, a ball mounted in the corresponding portion for engagement with the shaft recessed portion to permit pivotal movement of the shaft, resilient means connected near said other end of the shaft for permitting the shaft to exert axial pressure on the connecting member, and first and second indicating means communicating with the shaft for simultaneously measuring its movement responsive to the rotation of the tuner assembly, said first indicating means contacting the periphery of the shaft for measuring its pivotal lateral displacement responsive to the concentricity of the threaded elements, and said second indicating means engaging the connecting member for measuring the axial pressure exerted on the shaft responsive to the axial travel of the differential threaded element.

13. In a measuring apparatus, an outer member, a shaft pivotally mounted at one end and extending within the outer member, means at the other end of the shaft for receiving a workpiece, an inner member located between the outer member and shaft, means for providing relative movement between the inner and outer member for locating the shaft on a theoretical center line extending through the members, and indicating means contacting the periphery of the shaft for measuring the concentricity of the workpiece, said indicating means being responsive to the pivotal lateral displacement of the shaft upon movement of the workpiece.

References Cited in the file of this patent
UNITED STATES PATENTS

| | | |
|---|---|---|
| 2,770,050 | Johnson | Nov. 13, 1956 |
| 2,825,974 | Algatt et al. | Mar. 11, 1958 |
| 2,847,609 | Hamilton et al. | Aug. 12, 1958 |